United States Patent [19]

Altenhof et al.

[11] Patent Number: 4,777,384

[45] Date of Patent: Oct. 11, 1988

[54] SOURCE VOLTAGE TRIGGERED TIMER

[76] Inventors: Terrence G. Altenhof, 2115-12 Ave. N.W., Calgary, Alberta, Canada, T2N 1K1; Everett J. Altenhof, 1606 Crescent Road N.W., Calgary, Alberta, Canada, T2M 4B2

[21] Appl. No.: 109,862

[22] Filed: Oct. 19, 1987

[51] Int. Cl.⁴ ............................................ H01H 7/00
[52] U.S. Cl. .................................. 307/141; 307/141.4
[58] Field of Search .............. 307/112, 139, 140, 141, 307/141.4, 141.8, 132 R, 132 E, 116, 125; 340/309.15, 309.4; 368/107–113

[56] References Cited

U.S. PATENT DOCUMENTS

| | | | |
|---|---|---|---|
| 4,002,925 | 1/1977 | Monahan | 307/141 |
| 4,415,943 | 11/1983 | Wortman | 307/141 X |
| 4,540,984 | 9/1985 | Waldman | 307/141 X |
| 4,642,479 | 2/1987 | Lombardi et al. | 307/141 |

FOREIGN PATENT DOCUMENTS 1149490 7/1983 Canada .
1170751 7/1984 Canada .
1197548 12/1985 Canada .

Primary Examiner—Vit W. Miska

[57] ABSTRACT

A two mode timing device is described for insertion between an energizing control switch and a load. The device enables the load to be controlled in either a timing mode or a continuous mode. Selection of the mode that the device operates in depends upon a novel use of the energizing control switch and, in particular, depends upon usage of the control switch to de-energize the device for either a long duration or a short duration. Upon re-energizing the device, the load is then controlled in either the selected timing mode or the selected continuous mode. The timed mode has two variations. One timed mode embodiment energizes the load immediately and upon expiry of an internal selectable timer will de-energize the load. The other timed mode embodiment initially leaves the load de-energized, and upon expiry of the internal timer then energizes the load. The selection of continuous mode operation simply energizes the load for as long as the device itself is energized. The two timed modes and the one continuous mode give rise to four different versions of the device. The devices can be embodied for use with household light sockets, switched electrical outlets or wired directly into a circuit to control the associated load.

20 Claims, 3 Drawing Sheets

U.S. Patent    Oct. 11, 1988    Sheet 1 of 3    4,777,384
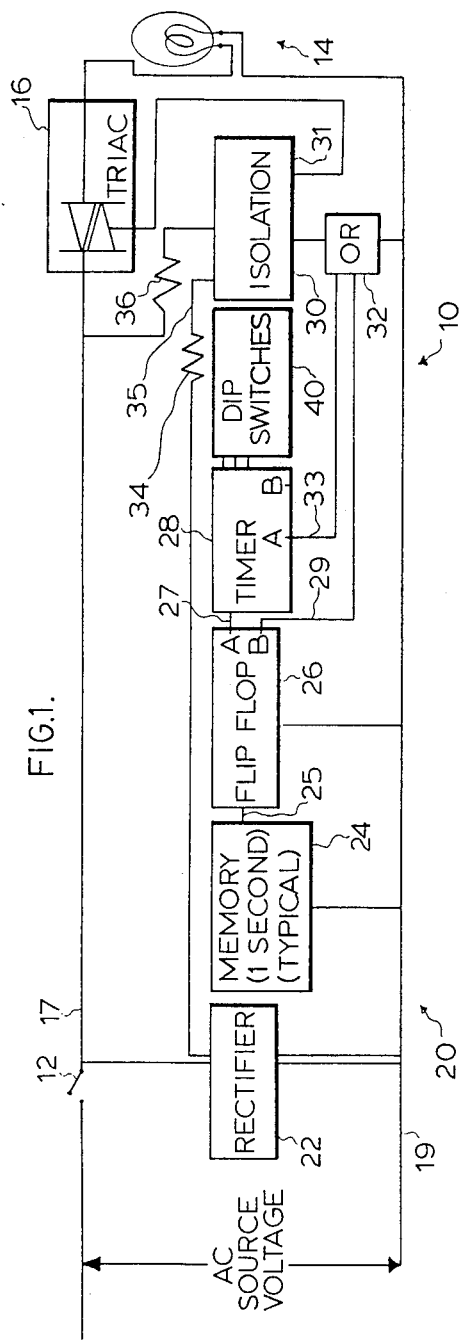
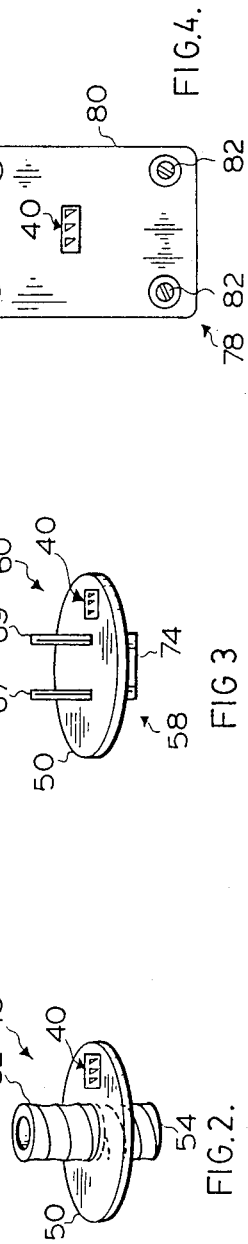

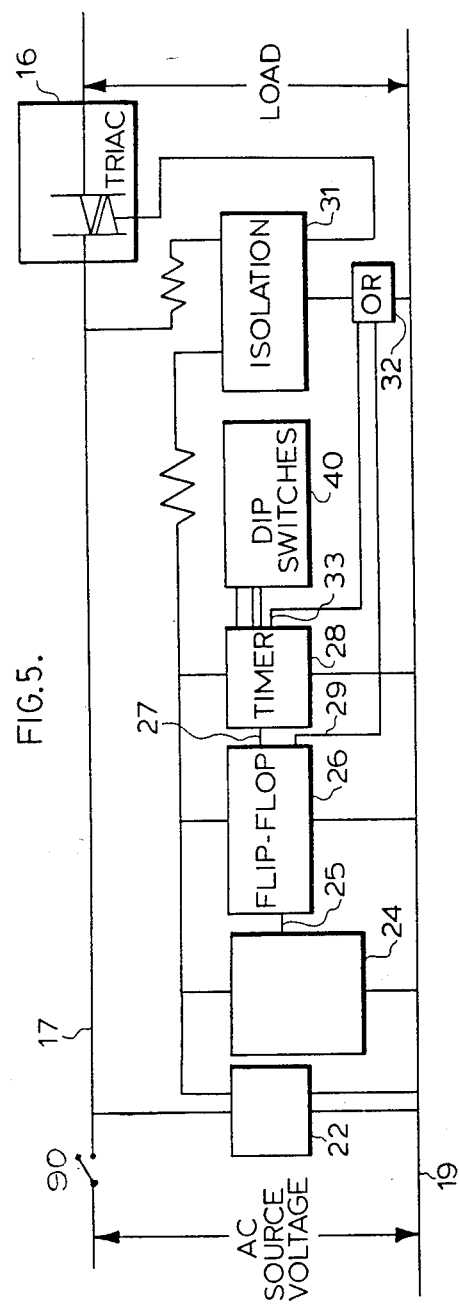

SOURCE VOLTAGE TRIGGERED TIMER

BACKGROUND TO THE INVENTION

This invention is directed to an electric circuit timing device, which has both a timed mode and a continuous mode of control over the associated load, and in particular to a selectively variable timing device operable by a remote switch.

Several different timing devices are available in the market. The most common is the "cyclical, time-of-day" timer to control lights in a set pattern every 24 hours such as Canadian Patent No. 1149490 issued to Boldstein et al, on No. 830705. Other more sophisticated controllers such as Canadian Patent Nos. 1197548 issued to Christiansen et al on Nos. 851203 and 1170751 issued to Eichelberger et al on No. 840710, involve the installation of a central control panel and the installation of individual addressed sensors at each of the loads to be controlled.

SUMMARY OF THE INVENTION

The subject device is inserted between an energizing control switch and its load. The device enables the energizing control switch to control the load in both a timed mode and in a continuous mode. In the timed mode of operation, a timer of selectable duration is used to control the load. The duration of the internal timer is selectable by means of small switches contained within the device.

In the continuous mode of operation, the device operates solely as a relay, thereby energizing the load for as long as the device is energized.

The selected operational mode of the device depends upon the duration of the most recent de-energized state of the device. The duration of the de-energized state of the device is in turn controlled by operation of the control switch.

The device contains a short term memory with a typical memory time of one to a few seconds duration after being de-energized. A de-energized state which is shorter than the short term memory will result in the memory still being asserted when the device is re-energized. This results in one mode of control over the load. A de-energized state which is longer than the short term memory will result in the memory not being asserted when the device is re-energized. This result in the continuous mode of control over the load.

Four versions of the device are contemplated. The versions differ in the mode of control which is exhibited in response to a long duration de-energized period and to a short duration de-energized period. The following table describes the operation of the four versions.

TABLE 1

| EMBODIMENT | LOAD CONTROL OPERATION | |
|---|---|---|
| | UPON ENERGIZING AFTER A LONG DURATION DE-ENERGIZED PERIOD | UPON ENERGIZING AFTER A SHORT DURATION DE-ENERGIZED PERIOD |
| Version 1 | Continuous mode. Load energized for as long as the device is energized. | Timed mode. Load initially energized until expiry of the timer, then de-energized. |
| Version 2 | As above | Timed mode. Load initially de-energized until expiry of the timer, then energized. |
| Version 3 | Timed mode. Load initially energized until expiry of the timer, then de-energized. | Continuous mode Load energized for as long as the device is energized. |
| Version 4 | Timed mode. Load initially de-energized until expiry of the timer, then energized. | As above |

One embodiment of the device is disclosed in inserted relationship between a wall switch and the associated light. The device can be embodied into a socket to socket adaptor and screwed into an existing light socket. The light bulb is then screwed into the socket of the device. A first embodiment, Version 1 of the device enables control of the light by using the existing wall switch as follows: the on-off control of the light is still accomplished as normal, by closing and opening the switch respectively; the timed control of the light is accomplished by, starting with the light initially on, turning the light off then on again within one second. This sequence puts the device into timed mode operation. The light will remain on until expiry of the internal selectable timed period, at which lapsed time period the device automatically turns the light off. The light switch will then still be in the "on" position. Alternative embodiment Versions 2, 3 and 4 will control the light in accordance with the previously described operating characteristics of Table 1.

Various other embodiments include the form of a plug-in to plug-in adaptor, for use in switched household electrical outlets. Alternatively, in the form of a terminal to terminal or pig-tail connection to pig-tail connection for direct wiring between the energizing control switch and the load.

An alternative embodiment is contemplated, for use with non-switched voltage supplies, such as standard household electrical outlets, wherein the control initiating switch is incorporated as part of the device and is connected in series with the device. The device functions in an identical manner whether the control switch is incorporated directly in the device or an existing remote switch is employed.

The present invention thus provides a load control switching device for interposition between a control switch and a load. The invention enables the load to be controlled in both a timed mode and a continuous mode. In use, several characteristics of the device are of note, as compared with existing timing devices.

First, the device enables normal on-off control to be exercised without being affected by the presence of the device.

Second, the device does not require any modification to the existing control switch. These two characteristics result in a user not even being made aware of the presence of the device during normal operation.

Third, the timing cycle begins from the moment of activation of the device, and is not initiated at a set time each day as is the case of cyclical time-of-day timers.

Fourth, the timing cycle duration can be pre-selected for a period varying from seconds to hours, thereby enabling the device to be used for a variety of applications.

Fifth, the device has four different variants, thereby further enabling the device to be used for a variety of applications.

Finally, the socket to socket and the plug to plug embodiments can be installed by anyone merely by insertion into an appropriate fixture and do not require an electrician for installation.

BRIEF DESCRIPTION OF THE DRAWING

Certain embodiments of the invention are described, reference being made to the accompanying drawings, wherein;

FIG. 1 is a schematic circuit diagram of a Version 1 embodiment for use with an existing external control switch;

FIG. 2 is a general view of a socket to socket adaptation embodiment of the subject invention;

FIG. 3 is a general view of a plug-to-plug adaptation embodiment of the subject invention;

FIG. 4 is a view of a terminal to terminal adaptation embodiment;

FIG. 5 is a schematic circuit diagram for an embodiment incorporating an internal control switch;

FIG. 6 is a view of a plug-to-plug adaptation embodiment of the FIG. 5 circuit arrangement with an internal control switch, and FIGS. 7-10 are enlarged portions of the FIG. 1 circuit showing the respective connections for Versions 1-4, embodiments, respectively.

DETAILED DESCRIPTION OF THE EMBODIMENTS

Figure 7:
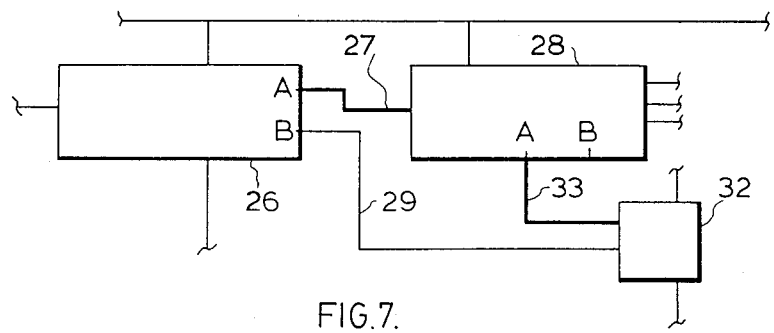

Referring to FIG. 1, the system 10 is shown in combination with an external control switch 12 and a load 14, represented pictorially as a lamp. FIG. 1 shows the circuit for Version 1 of the device. The circuits for Versions 2, 3 and 4 are described later in the text.

The system 10 comprises a triac switch 16 connected in series with the load 14.

A logic circuit 20, connected in controlling relation with triac switch 16 includes a rectifier 22, to energize the circuit 20. The circuit components energized by rectifier 22 comprise a short term memory 24, a flip-flop switch 26, a timer 28, an OR function 32, and an isolation device 30.

Referring also in part to Figure 7 for embodiment Version 1, the output 25 of memory 24 connects with the reset input of flip-flop 26. The A output of the flip-flop 26 connects with input 27 of timer 28. The B output of the flip-flop 26 connects with an OR function 32. The A and B outputs of flip-flop 26 are the logical inverse of one another such that when A is high, B is low and vice versa. The A output of timer 28 connects as the other input to OR function 32. The OR function 32, when energized completes the primary circuit of isolation 30, between rectified supply line 35 and ground return 19. A ballasting resistor 34 also is illustrated.

The control circuit of triac switch 16 has a shunt resistor 36, which completes energization of the triac when the output side of isolation 31 is closed.

The timer 28 is illustrated in connection with a plurality of DIP (Dual, In-Line, Package) single pole single throw switches 40 whereby the desired operating period of timer 28 may be pre-set for a desired period of seconds, minutes or hours, as required. Typically 3 DIP switches would yield 8 preset periods possibly of 15 seconds, 30 seconds, 1 minute, 2 minutes, 8 minutes, 15 minutes, 1 hour and 2 hours. The A and B outputs of timer 28 are the logical inverse of one another such that when A is high, B is low and vice versa.

In operation, the closing of switch 12 serves to begin to energize the system. If the memory 24 is low (i.e. a long duration de-energized period has just occurred) a low level 25 is presented to flip-flop 26. As energy is applied to the flip-flop 26 with 25 being low, the flip-flop 26 energizes itself in its inactive state to give a high output 29 to OR function 32 and a low output 27 to timer 28. The timer 28 thus is not energized. The high output 29 to OR function 32 energizes the isolation device 30 thereby closing the secondary circuit portion 31 of isolation device 30. This completes energizing of the triac control circuit so that triac 16 goes into a conducting mode, thereby energizing the load 14.

While the circuit 12, 17, 19 remains energized the triac 16 will remain switched on, to serve the load 14.

Interrupting the line voltage will cause the triac switch 16 to go into its non-conducting phase, and the load 14 will no longer be energized.

With the switch 12 in a closed position, the memory 24 is energized. Opening of switch 12 and substantially immediate reclosing thereof, within the short term memory span time of memory 24, results in the memory still being high when energy is re-applied to the flip-flop means. This results in the flip-flop means 26 energizing itself to its active state whereby the output 27 to timer 28 is a high output, while that to output 29 is a low output. The timer 28, being activated, asserts the A output and thereby energizes OR function 32, so that triac 16 is brought into operation, and the load 14 energized. When the preset time interval of timer 28 lapses, the A output goes low and the energization of OR function 32 is terminated; the primary side of isolation 30 is opened, and also the secondary or output side 31, so that triac 16 goes into its inactive phase and the supply to load 14 is terminated. The control circuit 20 will remain in this state until switch 12 is opened and subsequently reclosed, to energize the circuit 20 into one or other of its two modes, in accordance with whether or not the reclosure of switch 12 is within the short term of memory 24.

Figure 8:
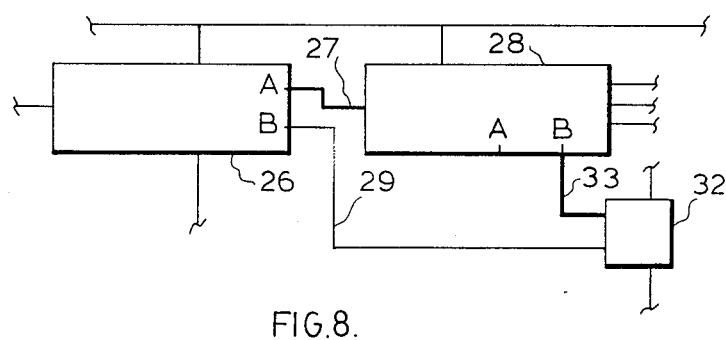

The circuit to achieve embodiment Version 2 type operation of the device is as shown in part in FIG. 8 having line 33 connected to the B output of timer 28. The flip flop 28 A and B outputs areconnected in the same arrangements as FIGS. 1 and 7. The timer 28 B output is the logical inverse of the A output. When the timer 28 is activated, the B output is initially low until expiry of the pre-set timer period, at which time the B output becomes high. Therefore, in selecting timed mode the load will initially be de-energized (corresponding to a low B output) until lapse of the timer pre-selected period at which time the load will be energized (in response to the high B output). The continuous mode of operation of the circuit is unaltered by this wiring change.

The circuit to achieve the embodiment, Version 3 and its associated operation is as shown in FIG. 9 having line 33 of OR 32 connected with the A output of timer 28; the line 27 of timer 28 connected to the B output of flip-flop 26 and line 29 connected to the A output of flip-flop 26. The timer 28 B output is the logical inverse of the A output. Upon energizing after a long duration de-energized period, the flip-flop 26 B output is high thereby energizing the timer 28 which in turn energizes the load until expiry of the pre-set timer period. Upon energizing after a short duration de-energized period, the timer 28 A output is high thereby energizing the OR function directly to continuously energize the load.

The circuit to achieve the embodiment Version 4 type operation is as shown in FIG. 10 having both the previous two modifications made. That is, line 33 is connected to the B output of timer 28, line 27 is connected to the B output of flip-flop 26 and line 29 is connected to the A output of flip-flop 26. Upon energizing after a long duration de-energized period, the B output of flip-flop 26 is high thereby energizing the timer. The B output of the timer is initially low (thereby de-energizing the load) and upon expiry of the pre-set timer period the B output goes high (thereby energizing the load). Upon energizing the circuit after a short duration de-energized period, the A output of flip-flop 26 is high thereby energizing the OR function directly (thereby continuously energizing the load).

Referring to the FIG. 2 embodiment, 48, a printed circuit board 50 having thereon the noted circuit 20 and the components thereof, has a threaded male plug 52 for connection into an existing light socket (not shown). A female socket 54 secured in supported relation to circuit board 50 receives a load 14 in the form of a light bulb.

Referring to the FIG. 3 embodiment, 58, a printed circuit board 50 having thereon the noted circuit 20 and the components thereof, has a male plug connector 60 for connection into a switched electrical outlet (not shown). A female plug 74 is connected mechanically and electrically to circuit board 50 to receive a load having male plug connection means.

Referring to the FIG. 4 embodiment, 78, a printed circuit board 80 having the noted circuit 20 and its components thereof has two screw connectors 81 for connection to the switched side of the circuit and two screw connectors 82 for connection to the load.

Turning to the FIGS. 5 and 6 embodiments, in place of external switch 12 of the FIG. 1 embodiment, a switch 90 is provided, forming part of the circuit.

We claim:

1. A load switching device for connecting between an energizing control switch and a load in energizing relation therewith comprising:
    relay switch means connected between said control switch and said load;
    and a logic circuit connected in controlling relation with said relay switch means;
    said logic circuit including memory means having a predetermined time to assert its memory after being energized and having a predetermined time of maintaining its memory after being de-energized;
    a flip flop means having an active and inactive state and controlled by the output of said memory means;
    said flip flop means having an output therefor connected indirectly in controlling relation with said relay switch means, wherein, upon energizing said logic circuit with said memory means not asserted immediately prior to said energizing, said flip-flop means is set in the inactive state wherein said flip-flop means sends a high level signal indirectly, in closing relation to said relay switch means, whereby said load is energized.

2. The load switching device as set forth in claim 1, said logic circuit including preset timer means connected in control signal receiving relation with an output of said flip flop means, wherein, upon energizing said logic circuit with said memory means asserted immediately prior to energizing, said flip-flop means is set in the active state wherein said flip-flop means sends a high level signal to said timer means; an output of said timer means sends a high level signal indirectly to said relay switch means whereby said load is energized until expiry of said preset timed internal at which time said timer means sends a low level signal indirectly to said relay switch means whereby said load is de-energized.

3. The load switching device as set forth in claim 1, said logic circuit including preset timer means connected in control signal receiving relation with an output of said flip-flop means, wherein, upon energizing said logic circuit with said memory means asserted immediately prior to energizing thereof, said flip-flop means is set in the active state wherein said flip-flop means sends a high level signal to said timer means; an output of said timer means sends a low level signal indirectly to said relay switch means whereby said load is not energized until expiry of said preset timed interval at which time said timer means sends a high level signal indirectly to said relay switch means whereby said load is energized.

4. A load switching device for connecting between an energizing control switch and a load in energizing relation therewith comprising: relay switch means connected between said control switch and said load; and a logic circuit connected in controlling relation with said relay switch means; said logic circuit including memory means having a predetermined time to assert its memory after being energized and having a predetermined time of maintaining its memory after being de-energized; a flip-flop means having an active and an inactive state and controlled by the output of said memory means; said flip-flop means having an output therefrom connected indirectly in controlling relation with said relay switch means, wherein, upon energizing said logic circuit with said memory means asserted immediately prior to energizing, said flip-flop means is set in the active state wherein said flip-flop means sends a high level signal indirectly in closing relation to said relay switch means, whereby said load is energized.

5. A load switching device as set forth in claim 4, said logic circuit including preset timer means connected in control signal receiving relation with an output of said flip-flop means, wherein, upon energizing said logic circuit with said memory means not asserted immediately prior to energizing said flip-flop means is set in the inactive state wherein said flip-flop means sends a high level signal to said timer means; an output of said timer means sends a high level signal indirectly to said relay switch means, whereby said load is energized until expiry of said preset timed interval at which time said timer means sends a low level signal indirectly to said relay switch means whereby said load is deenergised.

6. A load switching device as set forth in claim 4, said logic circuit including preset timer means connected in control signal receiving relation with an output of said flip-flop means, wherein, upon energizing said logic circuit with said memory means not asserted immediately prior to said energizing, said flip-flop means is set in the inactive state wherein said flip-flop means sends a high level signal to said timer means; an output of said timer means sends a low level signal indirectly to said relay switch means whereby said load is not energized until expiry of said preset timed interval, at which time said timer maans sends a high level signal indirectly to said relay switch means and said load is energized.

7. The devices as set forth in claim 2 where said relay switch means comprise a triac.

8. The device as set forth in claim 7, having an OR function means which receives inputs from said flip-flop means and said timer means, the output of said OR function means connecting with the input to an isolation means having the output thereof connected in controlling relation with said triac.

9. The device as set forth in claim 8, said timer means having a selector switch means connected thereto, for preselecting an active time interval for said timer means.

10. The device as set forth in claim 9, said selector switch means comprising a plurality of single pole, single throw DIP switches.

11. The device as set forth in claim 10, including rectifier means connected to said voltage source for energization thereby, having a direct voltage output to energize said logic circuit.

12. The device as set forth in claim 11, including male screw means for securing the device into a light socket.

13. The device as set forth in claim 11, including male plug connectors for plugging the device into an electrical outlet.

14. The device as set forth in claim 11 including screw lug connectors for connecting the device to a switched voltage supply.

15. The device as set forth in claim 11, including wire pigtail means for connecting the device to a switched voltage supply.

16. The device as set forth in claim 11, including female socket means for receiving a light bulb in inserted relation therein.

17. The device as set forth in claim 11, including female plug-in means for receiving male plug load connector means in inserted relation therein.

18. The device as set forth in claim 11, including lug connectors for connection to a load.

19. The device as set forth in claim 11, including wire pig tail means for connection to a load.

20. The device as set forth in claim 11, including a control switch incorporated as part of the device, to energize and de-energize the device.

* * * * *